United States Patent
Potti et al.

(10) Patent No.: US 10,838,956 B2
(45) Date of Patent: Nov. 17, 2020

(54) DATABASE ACCELERATION THROUGH RUNTIME CODE GENERATION

(71) Applicant: Pivotal Software, Inc., San Francisco, CA (US)

(72) Inventors: Navneet Sankara Potti, Madison, WI (US); Jignesh M. Patel, Madison, WI (US)

(73) Assignee: Pivotal Software, Inc., San Francisco, CA (US)

( * ) Notice: Subject to any disclaimer, the term of this patent is extended or adjusted under 35 U.S.C. 154(b) by 163 days.

(21) Appl. No.: 15/574,103

(22) PCT Filed: Aug. 26, 2016

(86) PCT No.: PCT/US2016/049073
§ 371 (c)(1),
(2) Date: Nov. 14, 2017

(87) PCT Pub. No.: WO2017/035497
PCT Pub. Date: Mar. 2, 2017

(65) Prior Publication Data
US 2018/0349438 A1 Dec. 6, 2018

Related U.S. Application Data (60) Provisional application No. 62/210,370, filed on Aug. 26, 2015.

(51) Int. Cl.
*G06F 16/248* (2019.01)
*G06F 16/2452* (2019.01)
(Continued)

(52) U.S. Cl.
CPC ......... *G06F 16/24526* (2019.01); *G06F 8/40* (2013.01); *G06F 16/248* (2019.01); *G06F 16/2455* (2019.01); *G06F 16/24553* (2019.01)

(58) Field of Classification Search
None
See application file for complete search history.

(56) References Cited

U.S. PATENT DOCUMENTS 6,496,817 B1 * 12/2002 Whang ............. G06F 16/90344
2004/0015783 A1 * 1/2004 Lennon ................. G06F 16/258
715/235

(Continued)

OTHER PUBLICATIONS

International Preliminary Report on Patentability in International Application No. PCT/US2016/049073, dated Feb. 27, 2018, 6 pages.

(Continued)

*Primary Examiner* — Wilson Lee
(74) *Attorney, Agent, or Firm* — Fish & Richardson P.C.

(57) ABSTRACT

Methods, systems, and computer program products for accelerate database through runtime code generation are described. A system provides a library of transformation functions that each transform an original function in an intermediate representation into a transformed function in the intermediate representation. The system receives a query. The system obtains an original database function used to execute the query, the original database function being in the intermediate representation. The system generates a new function that is a query specialized version of the original database function. The system generates a result for the query, including executing the new function instead of the original database function.

21 Claims, 6 Drawing Sheets

(51) Int. Cl.
*G06F 16/2455* (2019.01)
*G06F 8/40* (2018.01)

(56) References Cited

U.S. PATENT DOCUMENTS

| | | |
|---|---|---|
| 2012/0079468 A1 | 3/2012 | Gringauze et al. |
| 2013/0141443 A1 | 6/2013 | Schmit et al. |
| 2013/0159286 A1* | 6/2013 | Manzano Macho ........................ G06F 16/24542 707/718 |
| 2014/0109068 A1 | 4/2014 | Cabillic et al. |
| 2014/0280030 A1 | 9/2014 | Freedman et al. |
| 2014/0280068 A1* | 9/2014 | Dhoopar ............... G06F 11/079 707/722 |
| 2014/0280159 A1* | 9/2014 | Cao ..................... G06F 16/2456 707/737 |

OTHER PUBLICATIONS

International Search Report and Written Opinion for the International Application No. PCT/US2016/049073, dated Dec. 28, 2016, 9 pages.

Wanderjian-Milne et al., "Runtime Code Generation in Cloudera Impala," Bulletin of the IEEE Computer Society Technical Committee on Data Engineering, 2014, pp. 31-37.

\* cited by examiner

FIG. 1 (Prior Art)

```
Void HdfsAvroScanner::MaterializeTuple(MemPool* pool, uint8_t** data, Tuple* tuple) {
    BOOST_FOREACH(const SchemaElement& element, avro_header_->schema) {
        const SlotDescriptor* slot_desc = element.slot_desc;
        bool write_slot = false;
        void* slot = NULL;
        PrimitiveType slot_type = INVALID_TYPE;
        if (slot_desc !=NULL) {
            write_slot = true;
            slot = tuple->GetSlot(slot_desc->tuple_offset());
            slot_type = slot_desc->type().type;
        } avro_type_t type = element.schema->type;
        if (element.null_union_position != -1 && !ReadUnionType(element.null_union_position, data)) {
            type = AVRO_NULL;
        } switch (type) {
            case AVRO_NULL:
              if (slot_desc !=NULL) tuple->SetNull(slot_desc->null_indicator_offset());
              break;
            case AVRO_BOOLEAN:
              ReadAvroBoolean(slot_type, data, write_slot, slot, pool);
              break;
            case AVRO_INT32:
              ReadAvroInt32(slot_type, data, write_slot, slot, pool);
              break;
            case AVRO_INT64:
              ReadAvroInt64(slot_type, data, write_slot, slot, pool);
              break;
            case AVRO_FLOAT:
              ReadAvroFloat(slot_type, data, write_slot, slot, pool);
              break;
            case AVRO_DOUBLE:
              ReadAvroDouble(slot_type, data, write-slot, slot, pool);
              break;
            case AVRO_STRING:
            case AVRO_BYTES:
              if (slot_desc != NULL && slot_desc->type().type == TYPE_VARCHAR) {
                ReadAvroVarchar(slot_type, slot_desc->type().len, data, write_slot, slot, pool);
              } else if (slot_desc != NULL && slot_desc->type().type == TYPE_CHAR) {
                ReadAvroChar (slot_type, slot_desc->type().len, data, write_slot, slot, pool);
              } else {
                ReadAvroString(slot_type, data, write_slot, slot, pool);
              }
              break;
            case AVRO_DECIMAL: {
              int slot_byte_size = 0;
              if (slot_desc !=NULL) {
                DCHECK_EQ(slot_type, TYPE_DECIMAL);
                slot_byte_size = slot_desc->type().GetByteSize();
              }
              ReadAvroDecimal(slot_byte_size, data, write_slot, slot, pool);
              break;
            }
            default:
              DCHECK(false) << "Unsupported SchemaElement: " << type;
        }
    }
}
```

```
Function* HdfsAvroScanner::CodegenMaterializeTuple(HdfsScanNode* node, LlvmCodeGen* codegen) {
    const string& table_schema_str = node->hdfs_table()->avro_schema();
    if (table_schema_str.empty()) return NULL;

avro_schema_t raw_table_schema;
    int error = avro_schema_from_json_length(
        table_schema_str.c_str(), table_schema_str.size(), &raw_table_schema);
    ScopedAvroSchemaT table_schema(raw_table_schema);
    if (error != 0) {
        stringstream ss;
        ss << "Failed to parse table schema: " << avro_strerror();
        node->runtime_state*()->LogError(ss.str());
        return NULL;
    }
    int num_fields = avro_schema_record_size(table_schema.get());
    DCHECK_GT(num_fields, 0);
        for (int field_idx = 0; field_idx < num_fields; ++field_idx) {
        int col_idx = field_idx + node->num_partition_keys();
        int (slot_idx = node->GetMaterializedSlotIdx(col_idx);
        if (slot_idx != HdfsScanNode::SKIP_COLUMN) {
          SlotDescriptor* slot_desc = node->materialized_slots()[slot_idex];
          if (slot_desc->type().type == TYPE_CHAR) {
           LOG(INFO) << "Avro codegen skipped because CHAR is not supported.":
           return NULL
             }
        }
    }

LLVMContext& context = codegen->context();
    LlvmCodeGen::LlvmBuilder builder(context);

Type* this_type = codegen->GetType(HdfsAvroScanner::LLVM_CLASS_NAME);
    DCHECK(this_type !=NULL);
    PointerType* this_ptr_type = PointerType::get(this_type, 0);

TupleDescriptor* tuple_desc = const_cast<TupleDescriptor*>(NODE->tuple_desc());
    StructType* tuple_type = tuple_desc->GenerateLlvmStruct(codegen);
    Type* tuple_ptr_type = PointerType::get(tuple_type, 0);

Type* tuple_opaque_type = codegen->GetType(Tuple::LLVM_CLASS_NAME);
    PointerType* tuple_opaque_ptr_type = PointerType::get(tuple_opaque_type, 0);

Type* data_ptr_type = PointerType::get(codegen->ptr_type(), 0); // char**
    Type* mempool_type = PointerType::get(codegen->GetType(MemPool::LLVM_CLASS_NAME), 0);

LlvmCodeGen::FnProtoype prototype(codegen, "MaterializeTuple", codegen->void_type());
    prototype.AddArgument(LlvmCodeGen::NamedVariable("this", this_ptr_type));
    prototype.AddArgument(LlvmCodeGen::NamedVariable("pool", memopool_type));
    prototype.AddArgument(LlvmCodeGen::NamedVariable("data", data_ptr_type));
    prototype.AddArgument(LlvmCodeGen::NamedVariable("tuple", tuple_opaque_ptr_type));
    Value*args[4];
    Function*fn=prototype.GeneratePrototype(&builder, args);

Value* this_val = args[0];
    Value* this_val = args[1];
    Value* this_val = args[2];
    Value* opaque_tuple_val = args[3];

Value* tuple_val = builder.CreateBitCast(opaque_tuple_val, tuple_ptr_type, "tuple_ptr");
```

```
void* HdfsAvroScanner::CodegentMaterializeTuple(HdfsScanNode* node,
                                                LlvmCodeGen* codegene) {
    Function* orig_fn = codegen->GetFunction("MaterializedTuple");
    Function* new_fn = coodegen->CloneFunction(orig);

Constant schema = GetConsantStruct(node->avro_header_->schema, "Schema");
    codegen->ReplaceWithConstant(new_fn, "schema", schema);
    return codegen->JitCompileFunction(new_fn);
}
```

DATABASE ACCELERATION THROUGH RUNTIME CODE GENERATION

BACKGROUND

This specification relates to database systems.

The architects and engineers of today's cutting edge data management systems are faced with the challenge of delivering a growing diversity of functionality across a large variety of data, while also providing ever-greater efficiency of execution performance. These two goals are often in contradiction with each other, since traditional software engineering best practices to address the former (such as abstraction, inheritance, etc.) often lead to overheads during execution. Runtime code generation has been proposed as a solution to address this challenge, wherein the system generates and executes highly efficient, specialized code using information that is only known at runtime, including the characteristics of the data and the query (for instance, the types and sizes of the fields of each data record, and the columns selected by the specific query). This approach allows system developers to extract maximum runtime performance while writing code in full generality, adhering to the software engineering best practices that guarantee code readability and maintainability.

SUMMARY

Methods, systems, and computer program products for accelerate database through runtime code generation are described. A system provides a library of transformation functions that each transform an original function in an intermediate representation into a transformed function in the intermediate representation. The system receives a query. The system obtains an original database function used to execute the query, the original database function being in the intermediate representation. The system generates a new function that is a query-specialized version of the original database function. The system generates a result for the query, including executing the new function instead of the original database function.

The methods, systems, and computer program products described in this specification achieve the objective of speeding up execution using specialized code generation at runtime, but does so in a way that improves the manageability of the codebase over conventional code generation.

The disclosed techniques have advantages over conventional technologies. For example, the disclosed techniques increase code readability. Compared to the conventional technologies, a function with the specialized code corresponding to the original function can be less verbose and shorter. The specialized code can be easier to understand, since a developer would customarily read code, for example written in C/C++, which is intended to generate assembly-like IR, and the specialized code can be a logically equivalent, although specialized, version of the original function. Doing the transformations mentally in implementations of the disclosed techniques is easier than doing the same in implementations of conventional technologies. Accordingly, the disclosed techniques avoid distracting the programmer from following the logic embedded in the original code itself. Consequently, the disclosed techniques can result in increased productivity, and is less error prone. Furthermore, the disclosed techniques do not require all developers working with this part of the codebase to be familiar with LLVM IR. The disclosed techniques reduce complexity of writing, testing, and maintaining code generation functions in the codebase, as well as the difficulty in recruiting or training developers to work with such a codebase. Accordingly, the disclosed techniques are viable for data management product vendors and open source projects. Additionally, the disclosed techniques may encourage the use of code generation methods to functions beyond just a few of the most critical code segments.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

FIG. 2A is a diagram illustrating an example original function.

FIG. 2B is a diagram illustrating a portion of example code generated using conventional techniques.

Like reference numbers and designations in the various drawings indicate like elements.

DETAILED DESCRIPTION

Figure 1:
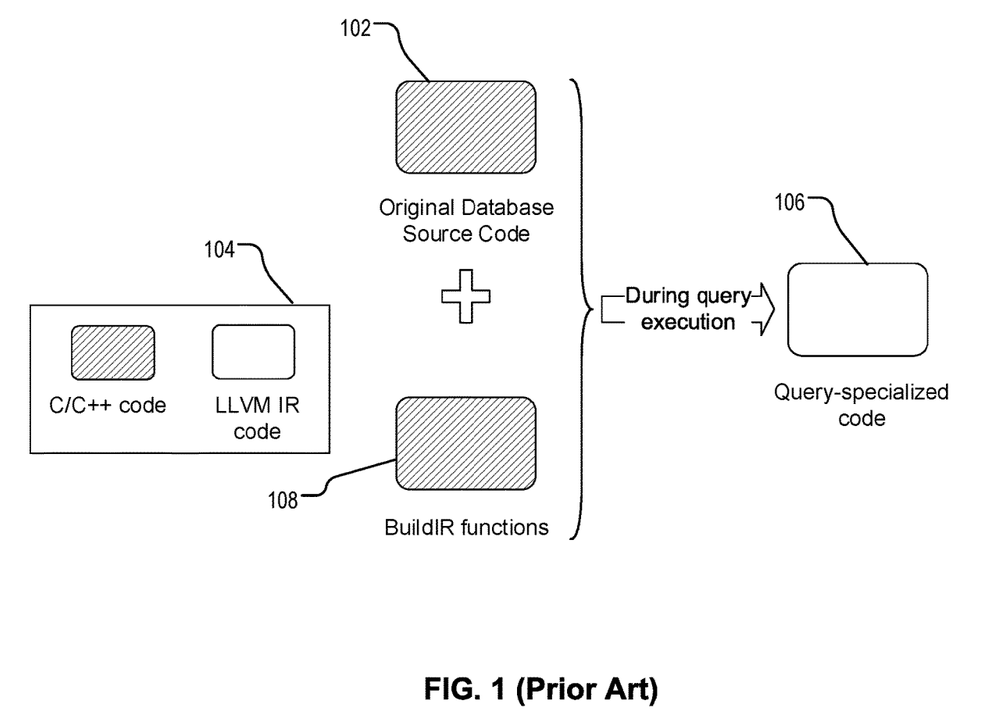
FIG. 1 is a block diagram illustrating conventional code generation technology.

FIG. 1 is a block diagram illustrating conventional code generation technology. The use of runtime code generation has become possible due to the availability of the LLVM Project, which includes a collection of modular and reusable compiler and toolchain technologies. LLVM libraries allow generation and optimization of code at runtime, using a technique called Just in Time (JIT) compilation. JIT compilation makes use of an Intermediate Representation (IR), which is a language similar to assembly language but with a few high-level constructs as well as type safety. Code written in many different programming languages, e.g., C, C++, Objective-C, Go, Haskell, and Python, can be compiled to LLVM IR using LLVM-based compilers, and the LLVM libraries can be used from many of these languages to generate IR at runtime as well.

In the example shown, original source code 102 includes a function F. Function F is configured to be executed once for each record of data being processed. For example, function F can be invoked in an "inner loop" in the original source code 102. Functions like function F are often ideal targets for runtime code generation, where a new specialized version F' is created and executed. This version F' is specific to the runtime context, as it has been optimized using runtime information, including the characteristics of the data, e.g., the types and sizes of the fields of each data record, and the query, e.g., the columns selected by the specific query. The method of generating this version F' in a conventional system, for example, is to use an intermediate representation builder 104, e.g., the LLVM C/C++ IRBuilder API, to generate an IR equivalent 106 to the specialized F', one instruction at a time. This is described, for example, in Wanderman-Milne, Skye, and Nong Li, "Runtime Code Generation in Cloudera Impala." IEEE Data Eng. Bull. 37.1 (2014): 31-37. Generating the IR equivalent

106 can include using build IR functions 108 to the original function F. The IR equivalent 106 is then optimized and converted into an executable version using other LLVM library API functions. This executable version is then invoked in place of the original function F.

FIG. 2A is a diagram illustrating an example original function. Code 202 can be the original function F as described in reference to FIG. 1.

FIG. 2B is a diagram illustrating a portion of example code generated using conventional techniques. Code 204 is generated from code 202 of FIG. 2A. Code 204 is a portion of the function F' as described in reference to FIG. 1. In some implementations, the entirety of the function F' can be longer than the portion as shown in code 204.

Figure 3:
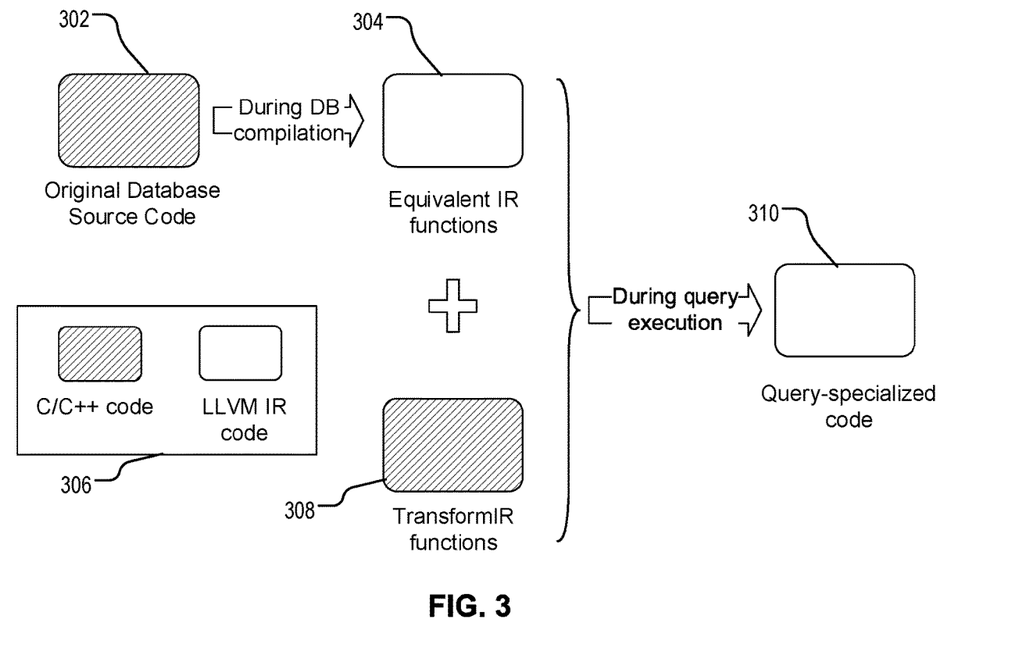
FIG. 3 is a block diagram illustrating example code generation techniques using a transform intermediate representation method.

FIG. 3 is a block diagram illustrating example code generation technology using a transform intermediate representation method. For convenience, the method is referred to as TransformIR.

During the initial compilation of the data management system code 302, e.g., the compilation from C/C++ source code, or source code in whatever language is used by the database developers, to executable, a system additionally compiles the source code to LLVM IR modules 304. These LLVM IR modules 304 are functionally equivalent to the original source code, and use nearly the same compile-time optimizations. When an original source function F is required to be specialized through code generation, the system uses the LLVM library API functions to load F and the corresponding module from the pre-compiled LLVM IR modules 306. This pre-compiled version of F is then transformed into the specialized version, referred to as F', using C/C++ LLVM IR manipulation API functions 308. Such transformations are easy to generalize and are provided in in a C/C++ library that can be used by developers without much knowledge of the LLVM IR. The transformed functions are then automatically optimized by the transformations in the library and compiled to an executable version 310, which is then invoked in place of the original function F.

Figure 4:
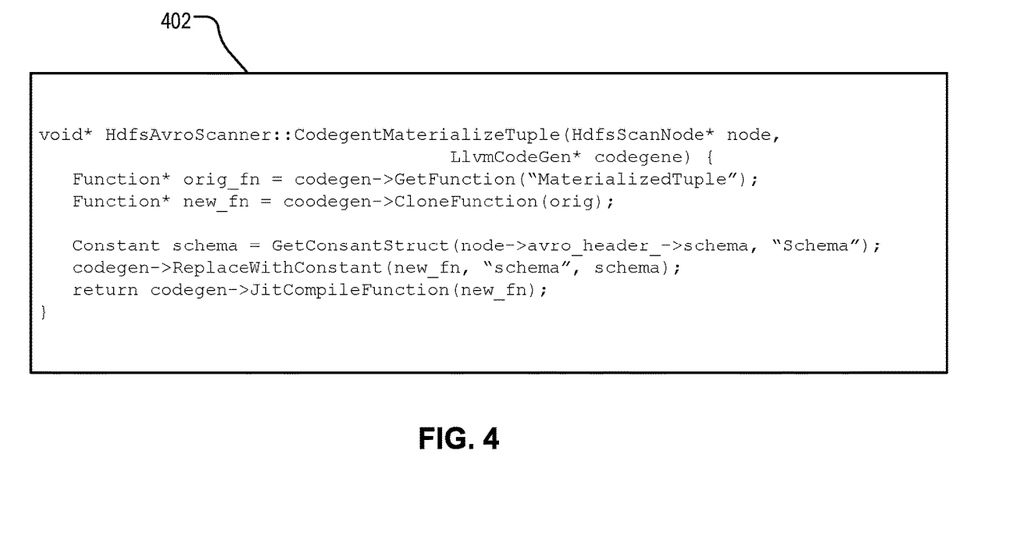
FIG. 4 is a diagram illustrating example code generated using a transform intermediate representation method.

In the TransformIR method, the C/C++ library functions that transform, i.e., specialize, the IR have a simple API: they accept the names of the functions, such as F, and variables to be specialized, as well as the runtime information to be used for specialization. These functions then return a specialized, optimized version of the function that can be invoked instead. It is also possible to apply multiple such transformations. Usage of these library functions requires only a high-level understanding of what runtime information can be used to specialize the original functions. In particular, the developers are not required to know any of the details of how such information gets used to actually perform the specialization of functions, and these details are abstracted away into the library, greatly simplifying the logic of code generation. An example is illustrated in FIG. 4. The existing code only needs to be minimally modified to make use of code generation. Thus, there is very little additional code complexity.

Since the transformations applied to the LLVM IR for runtime specialization are general, they can be independently tested to guarantee that the query execution results with and without code generation are logically equivalent. While there may be some additional overhead during database compilation, since the codebase must now be compiled twice, possibly using two different compilers, build-time performance is usually only a minor concern for data management systems. It is possible to reduce the compilation time overhead by reusing the LLVM IR modules 304 for generating the executable.

With these advantages, this method of runtime code generation is widely applicable to the development of data management systems, both proprietary as well as open-source products, and is far more usable than existing methods.

API Description:

The API exposed by the C/C++ library in the TransformIR method includes the following types of functions:

Those that look up and copy, i.e., clone, a function from the pre-compiled LLVM IR modules Those that modify an LLVM IR function by replacing variable values in the function with constant values known at runtime.

Those that modify an LLVM IR function by replacing functions invoked by it with other functions, which may possibly be generated functions. These invocations may be direct or indirect.

Those that modify an LLVM IR function by replacing dynamic memory allocations, e.g., in the heap, in the function with static, e.g., stack allocations of size known at runtime.

Those that apply standard compiler optimizations on an LLVM IR function, or on an LLVM module consisting of many such functions, and compile the IR functions to executable versions that can be invoked during query execution.

Convenience functions that individually provide the functionality of more than one of the functions above may also be included.

FIG. 4 is a diagram illustrating example code generated using a transform intermediate representation method. Code 402 is the generated from code 202 of FIG. 2A.

Figure 5:
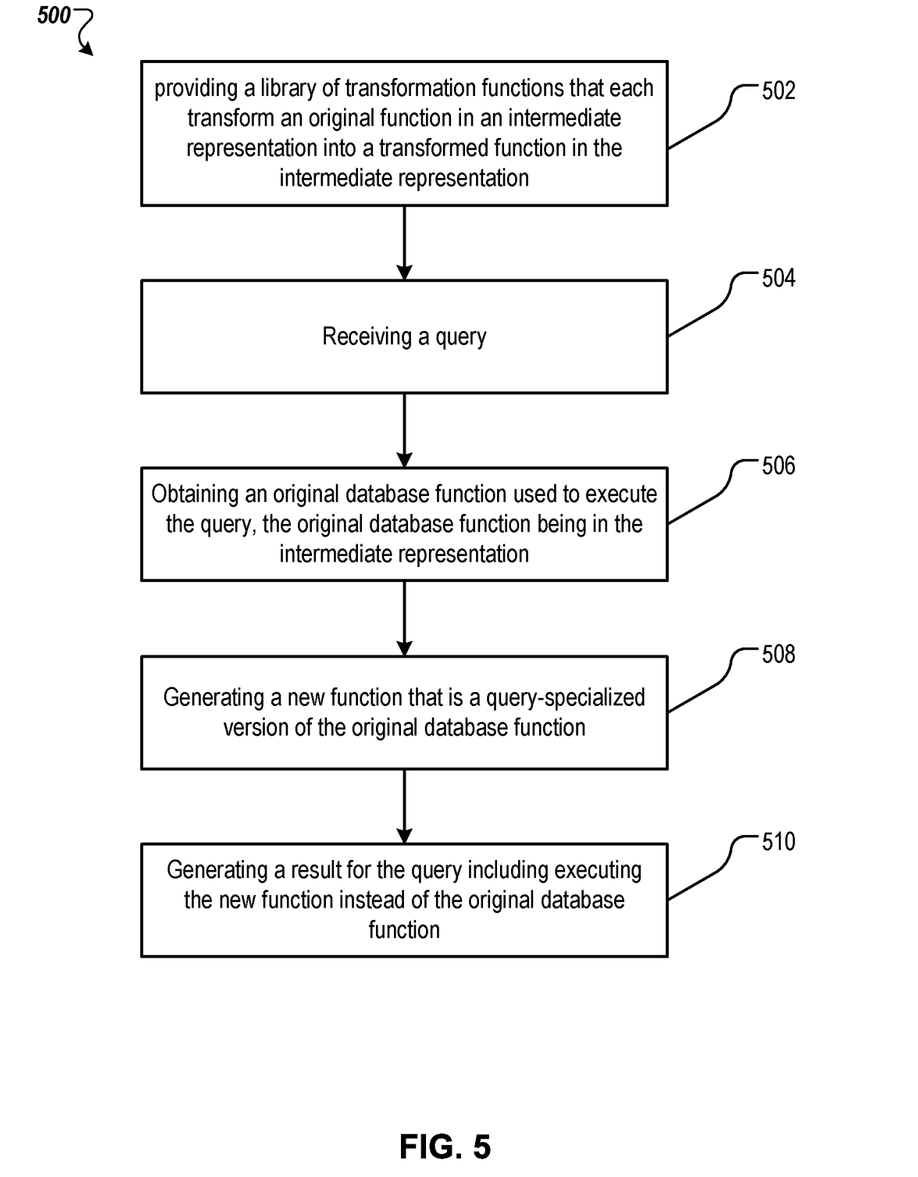
FIG. 5 is a flowchart of an example process of database acceleration through runtime code generation.

FIG. 5 is a flowchart of an example process 500 of database acceleration through runtime code generation. The process 500 can be performed by a system including one or more computers.

The system provides (502) a library of transformation functions that each transform an original function in an intermediate representation into a transformed function in the intermediate representation.

The system receives (504) a query. The intermediate representation of the original database function is generated before the query is received.

The system obtains (506) an original database function used to execute the query. The original database function is represented in the intermediate representation.

The system generates (508) a new function that is a query specialized version of the original database function. Generating the new function includes applying a user-specified sequence of the transformation functions to the original database function. At least one of the transformation functions in the sequence specializes the new function according to one or more properties of the query.

The user specified sequence of transformation functions can perform operations including cloning the original database function in the intermediate representation. The operations can include generating a new function in the intermediate representation. Generating the new function includes modifying the cloned version of the original database function in the intermediate representation. The user-specified sequence of transformation functions can perform operations including replacing a variable value in the original database function with a constant directed from a query specification. The user specified sequence of transformation functions can perform operations including replacing an invocation of a function in the original database function with an invocation of a different function. The user specified sequence of transformation functions can perform operations including replacing a dynamic memory allocation in the original database function with a static memory allocation of a size determined after the query is received. The user specified sequence of transformation functions can perform one or more compiler optimizations on the original database function.

The one or more properties of the query include one or more properties of a database table specified by the query.

The system generates (510) a result for the query. Generating the result includes executing the new function instead of the original database function.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    providing a library of transformation functions that each transform an original function in an intermediate representation into a transformed function in the intermediate representation;
    receiving a query;
    obtaining an original database function used to execute the query, the original database function being in the intermediate representation;
    generating a new function that is a query-specialized version of the original database function, including applying a user-specified sequence of the transformation functions to the original database function, wherein at least one of the transformation functions in the sequence specializes the new function according to one or more properties of the query, wherein the one or more properties of the query include one or more properties of a database table specified by the query; and
    generating a result for the query, including executing the new function instead of the original database function, wherein the method is performed by one or more computers.

2. The method of claim 1, wherein applying the user-specified sequence of the transformation functions comprises:
    cloning the original database function in the intermediate representation; and
    generating a new function in the intermediate representation including modifying the cloned version of the original database function in the intermediate representation.

3. The method of claim 1, wherein applying the user-specified sequence of the transformation functions comprises replacing a variable value in the original database function with a constant directed from a query specification.

4. The method of claim 1, wherein applying the user-specified sequence of the transformation functions comprises replacing an invocation of a function in the original database function with an invocation of a different function.

5. The method of claim 1, wherein applying the user-specified sequence of transformation functions comprises replacing a dynamic memory allocation in the original database function with a static memory allocation of a size determined after the query is received.

6. The method of claim 1, wherein applying the user-specified sequence of the transformation functions comprises performing one or more compiler optimizations on the original database function.

7. The method of claim 2, wherein the intermediate representation of the original database function is generated before the query is received.

8. A system comprising:
one or more computers and one or more storage devices storing instructions that are operable, when executed by the one or more computers, to cause the one or more computers to perform operations comprising:
providing a library of transformation functions that each transform an original function in an intermediate representation into a transformed function in the intermediate representation;
receiving a query;
obtaining an original database function used to execute the query, the original database function being in the intermediate representation;
generating a new function that is a query-specialized version of the original database function, including applying a user-specified sequence of the transformation functions to the original database function, wherein at least one of the transformation functions in the sequence specializes the new function according to one or more properties of the query, wherein the one or more properties of the query included one or more properties of a database table specified by the query; and
generating a result for the query including executing the new function instead of the original database function.

9. The system of claim 8, wherein applying the user-specified sequence of the transformation functions comprises:
cloning the original database function in the intermediate representation; and
generating a new function in the intermediate representation including modifying the cloned version of the original database function in the intermediate representation.

10. The system of claim 8, wherein applying the user-specified sequence of the transformation functions comprises replacing a variable value in the original database function with a constant directed from a query specification.

11. The system of claim 8, wherein applying the user-specified sequence of the transformation functions comprises replacing an invocation of a function in the original database function with an invocation of a different function.

12. The system of claim 8, wherein applying the user-specified sequence of the transformation functions comprises replacing a dynamic memory allocation in the original database function with a static memory allocation of a size determined after the query is received.

13. The system of claim 8, wherein applying the user-specified sequence of the transformation functions comprises performing one or more compiler optimizations on the original database function.

14. The system of claim 9, wherein the intermediate representation of the original database function is generated before the query is received.

15. A computer program product, encoded on one or more non-transitory computer storage media, comprising instructions that when executed by one or more computers cause the one or more computers to perform operations comprising:
providing a library of transformation functions that each transform an original function in an intermediate representation into a transformed function in the intermediate representation;
receiving a query;
obtaining an original database function used to execute the query, the original database function being in the intermediate representation;
generating a new function that is a query-specialized version of the original database function, including applying a user-specified sequence of the transformation functions to the original database function, wherein at least one of the transformation functions in the sequence specializes the new function according to one or more properties of the query, wherein the one or more properties of the query include one or more properties of a database table specified by the query; and
generating a result for the query including executing the new function instead of the original database function.

16. The computer program product of claim 15, wherein applying the user-specified sequence of the transformation functions comprises:
cloning the original database function in the intermediate representation; and
generating a new function in the intermediate representation including modifying the cloned version of the original database function in the intermediate representation.

17. The computer program product of claim 15, wherein applying the user-specified sequence of the transformation functions comprises replacing a variable value in the original database function with a constant directed from a query specification.

18. The computer program product of claim 15, wherein applying the user-specified sequence of the transformation functions comprises replacing an invocation of a function in the original database function with an invocation of a different function.

19. The computer program product of claim 15, wherein applying the user-specified sequence of the transformation functions comprises replacing a dynamic memory allocation in the original database function with a static memory allocation of a size determined after the query is received.

20. The computer program product of claim 15, wherein applying the user-specified sequence of the transformation functions comprises performing one or more compiler optimizations on the original database function.

21. The computer program product of claim 16, wherein the intermediate representation of the original database function is generated before the query is received.

* * * * *